US010711884B2

(12) United States Patent
Toyota et al.

(10) Patent No.: US 10,711,884 B2
(45) Date of Patent: Jul. 14, 2020

(54) CONTROL METHOD AND CONTROL DEVICE OF CONTINUOUSLY VARIABLE TRANSMISSION

(71) Applicant: Nissan Motor Co., Ltd., Kanagawa (JP)

(72) Inventors: Ryohey Toyota, Kanagawa (JP); Tomoyuki Nakano, Kanagawa (JP); Hiromu Terai, Kanagawa (JP); Akira Takano, Kanagawa (JP); Kouhei Toyohara, Sagamihara (JP)

(73) Assignee: Nissan Motor Co., Ltd., Kanagawa (JP)

( * ) Notice: Subject to any disclaimer, the term of this patent is extended or adjusted under 35 U.S.C. 154(b) by 6 days.

(21) Appl. No.: 16/329,531

(22) PCT Filed: Aug. 7, 2017

(86) PCT No.: PCT/JP2017/028628
§ 371 (c)(1),
(2) Date: Feb. 28, 2019

(87) PCT Pub. No.: WO2018/043052
PCT Pub. Date: Mar. 8, 2018

(65) Prior Publication Data
US 2019/0257413 A1 Aug. 22, 2019

(30) Foreign Application Priority Data
Aug. 29, 2016 (JP) ................................. 2016-166760

(51) Int. Cl.
*F16H 61/00* (2006.01)
*F16H 61/662* (2006.01)

(52) U.S. Cl.
CPC ....... *F16H 61/0031* (2013.01); *F16H 61/662* (2013.01); *F16H 2306/36* (2013.01); *F16H 2312/20* (2013.01)

(58) Field of Classification Search
None
See application file for complete search history.

(56) References Cited

U.S. PATENT DOCUMENTS 7,815,545 B2 * 10/2010 Nakashima ........... B60W 10/02
477/138
8,226,529 B2 * 7/2012 Rothenbuhler ......... F16H 59/40
477/45

(Continued)

FOREIGN PATENT DOCUMENTS

JP    2001-165293 A    6/2001
JP    2005-282694 A    10/2005

(Continued)

*Primary Examiner* — Dirk Wright
(74) *Attorney, Agent, or Firm* — Osha Liang LLP (57) ABSTRACT

A control method of a continuously variable transmission includes supplying oil pressure to a secondary pulley oil chamber by a source pressure oil pump, and controlling a flow of oil into and from a primary pulley oil chamber by an electric oil pump arranged in an oil passage between the primary pulley oil chamber and the secondary pulley oil chamber. After start-up of the source pressure oil pump, an operation of the electric oil pump is restricted until the oil is filled in the oil passage on the secondary pulley oil chamber side of the electric oil pump. The operation of the electric oil pump is permitted when rotation speed of the electric oil pump reaches a predetermined rotation speed.

4 Claims, 12 Drawing Sheets

(56) References Cited

U.S. PATENT DOCUMENTS

| | | | |
|---|---|---|---|
| 8,251,870 B2* | 8/2012 | Nihei | F16H 61/0031 |
| | | | 477/107 |
| 8,386,138 B2* | 2/2013 | Nihei | F16D 48/066 |
| | | | 701/21 |
| 10,364,887 B2* | 7/2019 | Van Rooij | F16H 61/30 |
| 10,584,789 B2* | 3/2020 | Toyota | F16H 61/061 |
| 2006/0189436 A1 | 8/2006 | Nakashima et al. | |
| 2010/0035721 A1 | 2/2010 | Rothenbuhler et al. | |

FOREIGN PATENT DOCUMENTS

| | | |
|---|---|---|
| JP | 2006-234013 A | 9/2006 |
| JP | 2008-240894 A | 10/2008 |
| JP | 2009-236255 A | 10/2009 |
| JP | 2015-010710 A | 1/2015 |

* cited by examiner

CONTROL METHOD AND CONTROL DEVICE OF CONTINUOUSLY VARIABLE TRANSMISSION

CROSS-REFERENCE TO RELATED APPLICATIONS

This application is a national stage application of PCT Application No. PCT/JP2017/028628 filed Aug. 7, 2017, and claims priority to Japanese Patent Application No. 2016-166760 filed on Aug. 29, 2016 in the Japan Patent Office, the entire disclosure of which are incorporated herein by reference in their entirety.

BACKGROUND

Technical Field

The present invention relates to control of a continuously variable transmission.

Related Art

JP2008-240894A1 discloses a hydraulic circuit of a continuously variable transmission including a source pressure oil pump adapted to pump up oil from an oil pan and generate line pressure serving as source pressure for shift, and an electric oil pump for shift. In the hydraulic circuit described in the above document, communication is provided between a primary pulley oil chamber and a secondary pulley oil chamber, and the electric oil pump is placed in a shift oil passage connected to an oil passage of the line pressure. In the hydraulic circuit described in the above document, by adjusting a flow of the oil into and from the primary pulley oil chamber by the electric oil pump, shift control is performed.

SUMMARY OF INVENTION

In a continuously variable transmission including the hydraulic circuit described in the above document, there is a need for filling the oil in the shift oil passage for performing the shift control. Therefore, when the hydraulic circuit is in a state where the oil is removed, the so-called no-oil state and an engine is started up and the shift control is started, so-called air entrainment occurs in the electric oil pump until the oil is filled in the shift oil passage, and noises are generated.

However, the above document does not describe control in a case where the engine is started up in the no-oil state.

A control method according to one or more embodiments of the present invention may be capable of suppressing a harmful effect caused by start of shift control in a no-oil state, such as noise generation due to the air entrainment as described above.

According to one or more embodiments of the present invention, a control method of a continuously variable transmission, comprising
supplying oil pressure to a secondary pulley oil chamber by a source pressure oil pump, and controlling an flow of oil into and from a primary pulley oil chamber by an electric oil pump arranged in an oil passage between the primary pulley oil chamber and the secondary pulley oil chamber is provided. In the control method of a continuously variable transmission, after start-up of the source pressure oil pump, an operation of the electric oil pump is restricted until the oil is filled in the oil passage on the secondary pulley oil chamber side of the electric oil pump.

DETAILED DESCRIPTION

Hereinafter, embodiments of the present invention will be described with reference to the attached drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
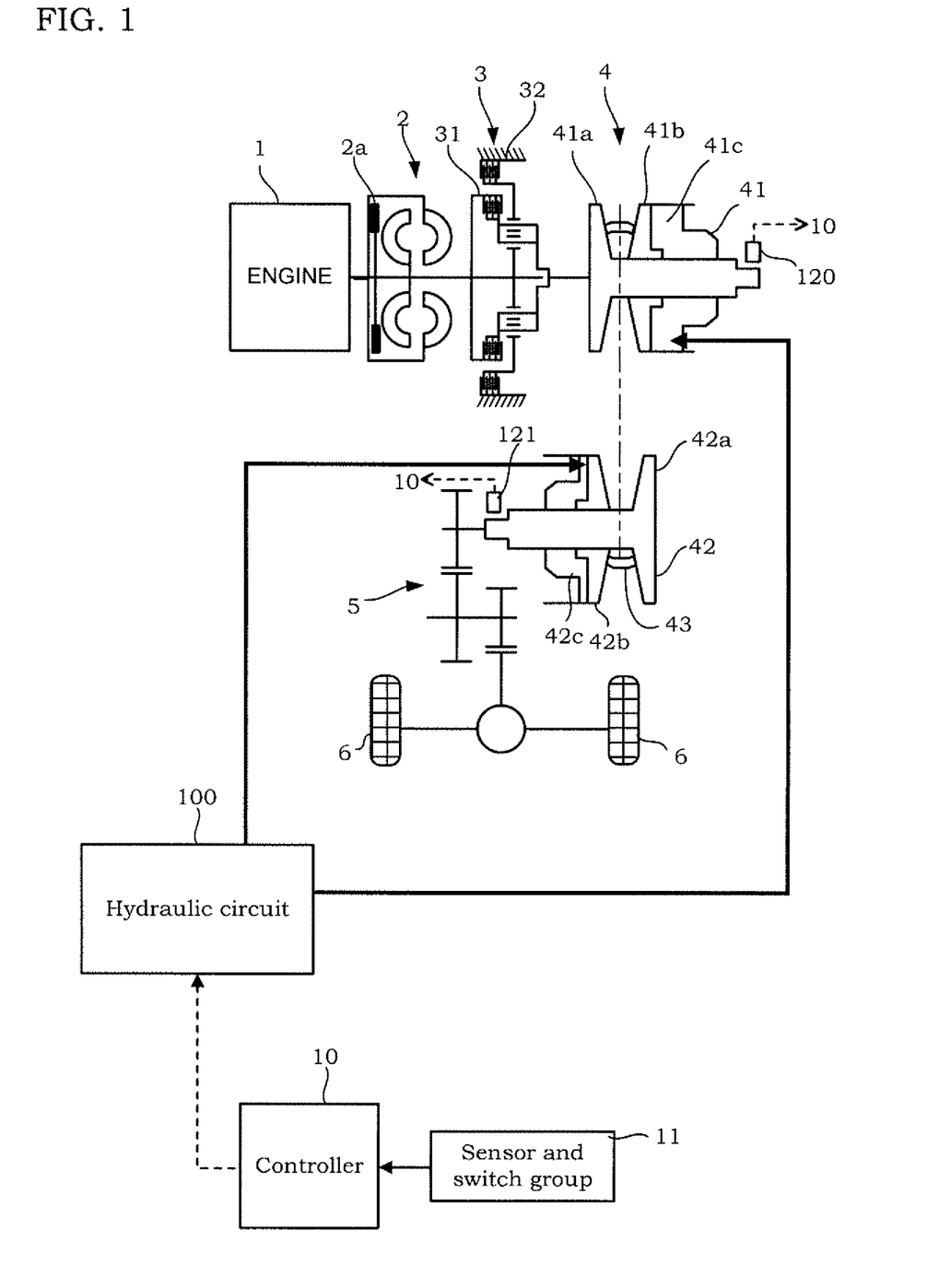
FIG. 1 is a schematic configuration diagram of a vehicle.

FIG. 1 is a schematic configuration diagram of a vehicle. The vehicle includes an engine 1, a torque converter 2 having a lock-up clutch 2a, a forward/reverse switching mechanism 3, a variator 4, a final reduction mechanism 5, drive wheels 6, and a hydraulic circuit 100.

The engine 1 is a drive source of the vehicle. An output of the engine 1 is transmitted to the drive wheels 6 via the torque converter 2, the forward/reverse switching mechanism 3, the variator 4, and the final reduction mechanism 5. Therefore, the variator 4 is provided in a motive power transmission route through which motive power is transmitted from the engine 1 to the drive wheels 6 together with the torque converter 2, the forward/reverse switching mechanism 3, and the final reduction mechanism 5.

The forward/reverse switching mechanism 3 is provided between the torque converter 2 and the variator 4 in the above motive power transmission route. The forward/reverse switching mechanism 3 switches the rotation direction of inputted rotation between the forward rotation direction corresponding to a forward run and the reverse rotation direction corresponding to a reverse run.

Specifically, the forward/reverse switching mechanism 3 includes a forward clutch 31 and a reverse brake 32. The forward clutch 31 is engaged in a case where the rotation direction is the forward rotation direction. The reverse brake 32 is engaged in a case where the rotation direction is the reverse rotation direction. One of the forward clutch 31 and the reverse brake 32 can be formed as a clutch adapted to turn rotation on and off between the engine 1 and the variator 4.

The variator 4 has a primary pulley 41, a secondary pulley 42, and a belt 43 looped over the primary pulley 41 and the secondary pulley 42. Hereinafter, the term "primary" will also be referred to as "PRI," and the term "secondary" will also be referred to as "SEC." The variator 4 changes a loop diameter of the belt 43 (hereinafter, also simply referred to as the "loop diameter") by changing groove widths of the PRI pulley 41 and the SEC pulley 42, and forms a belt continuously variable transmission mechanism adapted to perform shift.

The PRI pulley 41 includes a fixed pulley 41a and a movable pulley 41b. By a controller 10 controlling an oil amount supplied to a PRI pulley oil pressure camber 41c, the movable pulley 41b is activated and the groove width of the PRI pulley 41 is changed.

The SEC pulley 42 includes a fixed pulley 42a and a movable pulley 42b. By the controller 10 controlling SEC pressure which is pulley pressure supplied to a SEC pulley oil pressure chamber 42c, the movable pulley 42b is activated and the groove width of the SEC pulley 42 is changed. Pulley pressure supplied to the PRI pulley oil pressure chamber 41c is referred to as PRI pressure.

The belt 43 is looped over a V-shaped sheave surface formed by the fixed pulley 41a and the movable pulley 41b of the PRI pulley 41, and a V-shaped sheave surface formed by the fixed pulley 42a and the movable pulley 42b of the SEC pulley 42.

The final reduction mechanism 5 transmits output rotation from the variator 4 to the drive wheels 6. The final reduction mechanism 5 has plural gear trains and differential gears. The final reduction mechanism 5 rotates the drive wheels 6 via an axle.

The hydraulic circuit 100 supplies oil pressure to the variator 4, specifically, to the PRI pulley 41 and the SEC pulley 42. The hydraulic circuit 100 also supplies the oil pressure to the forward/reverse switching mechanism 3, the lock-up clutch 2a, and a lubrication system and a cooling system (not shown). Specifically, the hydraulic circuit 100 is formed as follows.

Figure 2:
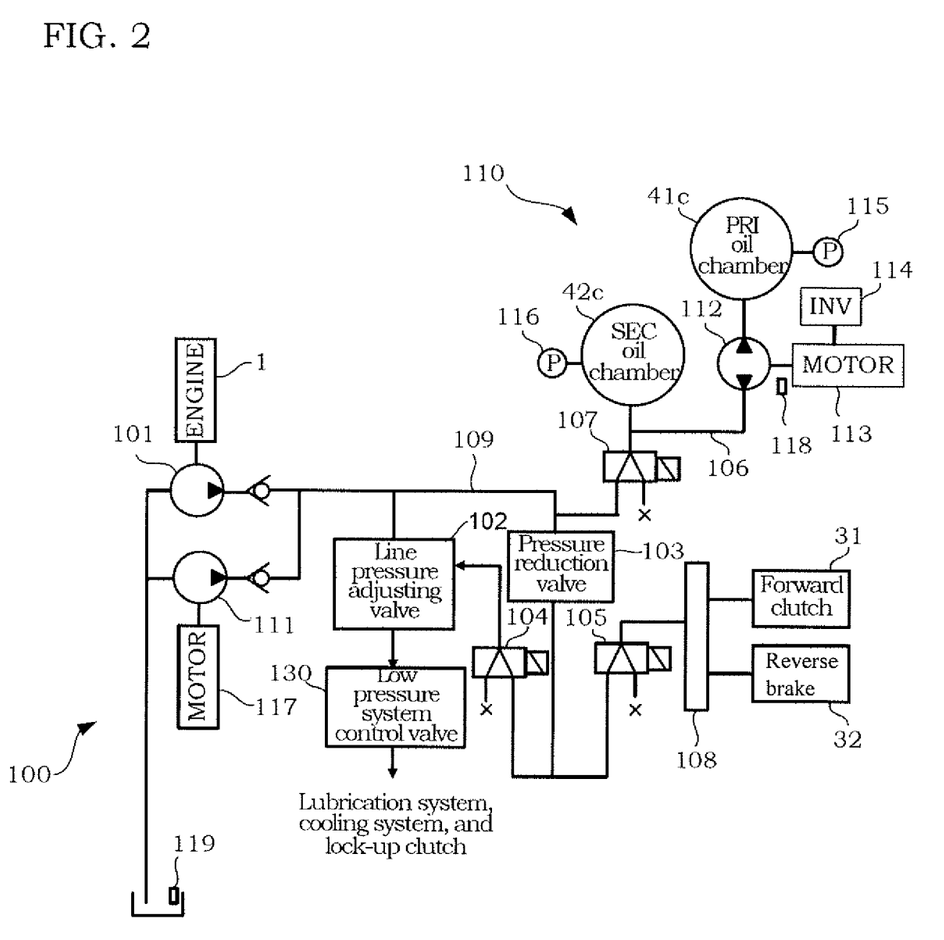
FIG. 2 is a schematic configuration diagram of a hydraulic circuit.

FIG. 2 is a schematic configuration diagram of the hydraulic circuit 100. The hydraulic circuit 100 includes a source pressure oil pump 101, a line pressure adjusting valve 102, a pressure reduction valve 103, a line pressure solenoid valve 104, a forward/reverse switching mechanism solenoid valve 105, a shift circuit pressure solenoid valve 107, a manual valve 108, a line pressure oil passage 109, a low pressure system control valve 130, a shift circuit 110, and a line pressure electric oil pump 111. Hereinafter, the solenoid valve will be referred to as the SOL.

The source pressure oil pump 101 is a mechanical oil pump to be driven by motive power of the engine 1. The source pressure oil pump 101 is connected to the line pressure adjusting valve 102, the pressure reduction valve 103, and the shift circuit pressure SOL 107 and the line circuit 110 via the line pressure oil passage 109. The line pressure oil passage 109 forms an oil passage of line pressure. The line pressure is oil pressure serving as source pressure of the PRI pressure and the SEC pressure.

The line pressure electric oil pump 111 is driven by an electric motor 117. The line pressure electric oil pump 111 is operated for supplying the line pressure for example in a case where the engine 1 is stopped by idling stop control and accordingly the source pressure oil pump 101 is stopped.

The line pressure adjusting valve 102 generates the line pressure by adjusting the oil pressure generated by the oil pump 101. The generation of the line pressure by the oil pump 101 includes generation of the line pressure on the basis of such an action of the line pressure adjusting valve 102. Oil released by the line pressure adjusting valve 102 at the time of pressure adjustment is supplied to the lock-up clutch 2a, the lubrication system, and the cooling system via the low pressure system control valve 130.

The pressure reduction valve 103 reduces the line pressure. The oil pressure reduced by the pressure reduction valve 103 is supplied to the line pressure SOL 104 and the forward/reverse switching mechanism SOL 105.

The line pressure SOL 104 is a linear solenoid valve and generates control oil pressure corresponding to a control electric current. The control oil pressure generated by the line pressure SOL 104 is supplied to the line pressure adjusting valve 102, and the line pressure adjusting valve 102 is activated in accordance with the control oil pressure generated by the line pressure SOL 104 to perform pressure adjustment. Therefore, it is possible to set a command value of line pressure PL by the control electric current to the line pressure SOL 104.

The forward/reverse switching mechanism SOL 105 is a linear solenoid valve and generates oil pressure corresponding to a control electric current. The oil pressure generated by the forward/reverse switching mechanism SOL 105 is supplied to the forward clutch 31 and the reverse brake 32 via the manual valve 108 activated in accordance with operation of a driver.

The shift circuit pressure SOL 107 is a linear solenoid valve and generates oil pressure to be supplied to the shift circuit 110 in accordance with a control electric current. Therefore, it is possible to set a command value of shift circuit pressure by the control electric current to the shift circuit pressure SOL 107. The shift circuit pressure generated by the shift circuit pressure SOL 107 is supplied to a shift oil passage 106. The shift circuit pressure may be generated by a SOL adapted to generate control oil pressure corresponding to a control electric current, and a pressure adjusting valve adapted to generate control circuit pressure from the line pressure PL in accordance with the control oil pressure generated by the SOL.

The shift circuit 110 includes a shift oil passage 106 connected to the line pressure oil passage 109 via the shift circuit pressure SOL 107, and a shift oil pump 112 placed in the shift oil passage 106. The shift oil passage 106 provides communication between the PRI pulley oil pressure chamber 41c and the SEC pulley oil pressure chamber 42c.

The shift oil pump 112 is an electric oil pump to be driven by an electric motor 113. The electric motor 113 is controlled by the controller 10 via an inverter 114. The rotation direction of the shift oil pump 112 is switchable between the forward direction and the reverse direction. The forward direction mentioned above is the direction in which the oil is fed from the SEC pulley oil pressure chamber 42c side to the PRI pulley oil pressure chamber 41c side. The reverse direction is the direction in which the oil is fed from the PRI pulley oil pressure chamber 41c side to the SEC pulley oil pressure chamber 42c side.

When the shift oil pump 112 is rotated in the forward direction, the oil in the shift oil passage 106 and the SEC pulley oil pressure chamber 42c is supplied to the PRI pulley oil pressure chamber 41c. Thereby, the movable pulley 41b of the PRI pulley 41 is moved in the direction of coming close to the fixed pulley 41a, and the groove width of the PRI pulley 41 is reduced. Meanwhile, the movable pulley 42b of the SEC pulley 42 is moved in the direction of going away from the fixed pulley 42a, and the groove width of the SEC pulley 42 is increased. At the time of forward rotation of the shift oil pump 112, the oil is supplied from the line pressure oil passage 109 to the shift oil passage 106 in such a manner that oil pressure of the shift oil passage 106 on the SEC pulley oil pressure chamber 42c side (hereinafter, also referred to as the "SEC side") of the shift oil pump 112 (hereinafter, also referred to as the "SEC side oil pressure") is not less than the command value of the shift circuit pressure. The command value of the shift circuit pressure is set in consideration with prevention of slip of the belt 43, etc. Oil pressure of the shift oil passage 106 on the PRI pulley oil pressure chamber 41c side (hereinafter, also referred to as the "PRI side") of the shift oil pump 112 will also be referred to as the PRI side oil pressure.

When the shift oil pump 112 is rotated in the reverse direction, the oil flows out of the PRI pulley oil chamber 41c. Thereby, the movable pulley 41b of the PRI pulley 41 is moved in the direction of going away from the fixed pulley 41a, and the groove width of the PRI pulley 41 is increased. Meanwhile, the movable pulley 42b of the SEC pulley 42 is moved in the direction of coming close to the fixed pulley 42a, and the groove width of the SEC pulley 42 is reduced. Although the SEC side oil pressure is increased by an inflow of the oil flowing out of the PRI pulley oil pressure chamber 41c, the SEC side oil pressure is controlled not to exceed the command value by the shift circuit pressure SOL 107. That is, in a case where the SEC side oil pressure exceeds the command value, the oil is discharged from the shift oil passage 106 via the shift circuit pressure SQL 107. Meanwhile, in a case where the SEC side oil pressure is less than the command value, the oil flows in from the line pressure oil passage 109 via the shift circuit pressure SOL 107.

As described above, in the continuously variable transmission of the first embodiment, shift is performed by the shift oil pump 112 controlling a flow of the oil into and from the PRI pulley oil pressure chamber 41c. An outline of shift control will be described later.

Returning to FIG. 1, the vehicle further includes the controller 10. The controller 10 is an electronic control device, and signals from a sensor and switch group 11 are inputted to the controller 10. The controller 10 is formed by a microcomputer including a central processing unit (CPU), a read-only memory (ROM), a random access memory (RAM), and an input/output interface (I/O interface). The controller 10 may be formed by plural microcomputers.

The sensor and switch group 11 includes an accelerator pedal opening sensor adapted to detect an accelerator pedal opening of the vehicle, a brake sensor adapted to detect brake pedal force of the vehicle, a vehicle speed sensor adapted to detect vehicle speed Vsp, and an engine rotation speed sensor adapted to detect rotation speed NE of the engine 1.

The sensor and switch group 11 further includes, for example, a PRI pressure sensor 115 adapted to detect the PRI pressure, a SEC pressure sensor 116 adapted to detect the SEC pressure, a PRI rotation speed sensor 120 adapted to detect input side rotation speed of the PRI pulley 41, a SEC rotation speed sensor 121 adapted to detect output side rotation speed of the SEC pulley 42, a pump rotation speed sensor 118 adapted to detect rotation speed of the shift oil pump 112, and an oil temperature sensor 119 adapted to detect a temperature of the oil. The signals from the sensor and switch group 11 may be inputted to the controller 10 via other controllers, for example. The same is applied to signals of information, etc. generated by other controllers on the basis of the signals from the sensor and switch group 11.

The controller 10 controls the hydraulic circuit 100 on the basis of the signals from the sensor and switch group 11. Specifically, the controller 10 controls the line pressure SOL 104 and the shift circuit 110 shown in FIG. 2. The controller 10 is formed to further control the forward/reverse switching mechanism SOL 105 and the shift circuit pressure SOL 107.

Upon controlling the line pressure SOL 104, the controller 10 applies a control electric current corresponding to the command value of the line pressure PL to the line pressure SOL 104.

When executing the shift control, the controller 10 sets a target speed ratio on the basis of the signals from the sensor and switch group 11. Once the target speed ratio is determined, loop dimeters (target loop diameters) of the pulleys 41, 42 for realizing the target speed ratio are determined. Once the target loop diameters are determined, groove widths (target groove widths) of the pulleys 41, 42 for realizing the target loop diameters are determined.

In the shift circuit 110, the movable pulley 41b of the PRI pulley 41 is moved in accordance with the inflow and the outflow of the oil to and from the PRI pulley oil pressure chamber 41c by the shift oil pump, and accordingly, the movable pulley 42b of the SEC pulley 42 is also moved. That is, there is a correlation between a movement amount of the movable pulley 41b of the PRI pulley 41 and a movement amount of the movable pulley 42b of the SEC pulley 42.

The controller 10 operates the shift oil pump 112 in such a manner that a position of the movable pulley 41b of the PRI pulley 41 is a position corresponding to the target speed ratio. Whether or not the movable pulley 41b is at a desired position is determined by calculating an actual speed ratio from detection values of the PRI rotation speed sensor 120 and the SEC rotation speed sensor 121 and determining whether or not the actual speed ratio matches with the target speed ratio.

The operation of the shift oil pump 112 by the controller 10 is not limited to the time of shift. Even in a case where the target speed ratio is not changed but in a case where the oil is leaked out of the pulley oil pressure chambers 41c, 42c and the actual speed ratio is changed, the controller 10 operates the shift oil pump 112. In the first embodiment, such control for maintaining the target speed ratio is included in the shift control.

That is, the shift control of the first embodiment is feedback control of bringing the position of the movable pulley 41b of the PRI pulley 41 to a target position. An object to be controlled in the feedback control is not the oil pressure of the pulley oil pressure chambers 41c, 42c but the groove width of the PRI pulley 41, in other words, the position of the movable pulley 41b.

A sensor adapted to detect the position of the movable pulley 41b may be provided to determine whether or not the movable pulley 41b is at a position corresponding to the target speed ratio.

In a so-called ignition-off state, both the source pressure oil pump 101 and the line pressure electric oil pump 111 are stopped. Thus, no oil pressure is supplied to the line pressure oil passage 109 and the SEC pulley oil pressure chamber 42c. Therefore, for example, in a case where a long time passes after an end of driving the vehicle, the oil may be removed from the oil passages of the hydraulic circuit in a so-called no-oil state. When the engine 1 is started up in this no-oil state and the shift control is immediately started, the shift oil pump 112 is operated in a state where the oil is not filled in the line pressure oil passage 109 and the shift oil passage 106. Then, the shift oil pump 112 performs so-called idle pumping, and noises are generated due to the air entrainment described above. When the shift oil pump 112 is operated in the no-oil state, lubrication of a bearing portion becomes insufficient and there is a possibility that the shift oil pump 112 is deteriorated.

In the first embodiment, in order to suppress a harmful effect caused by start of the shift control in the no-oil state, the controller 10 executes control to be described below.

Figure 3:
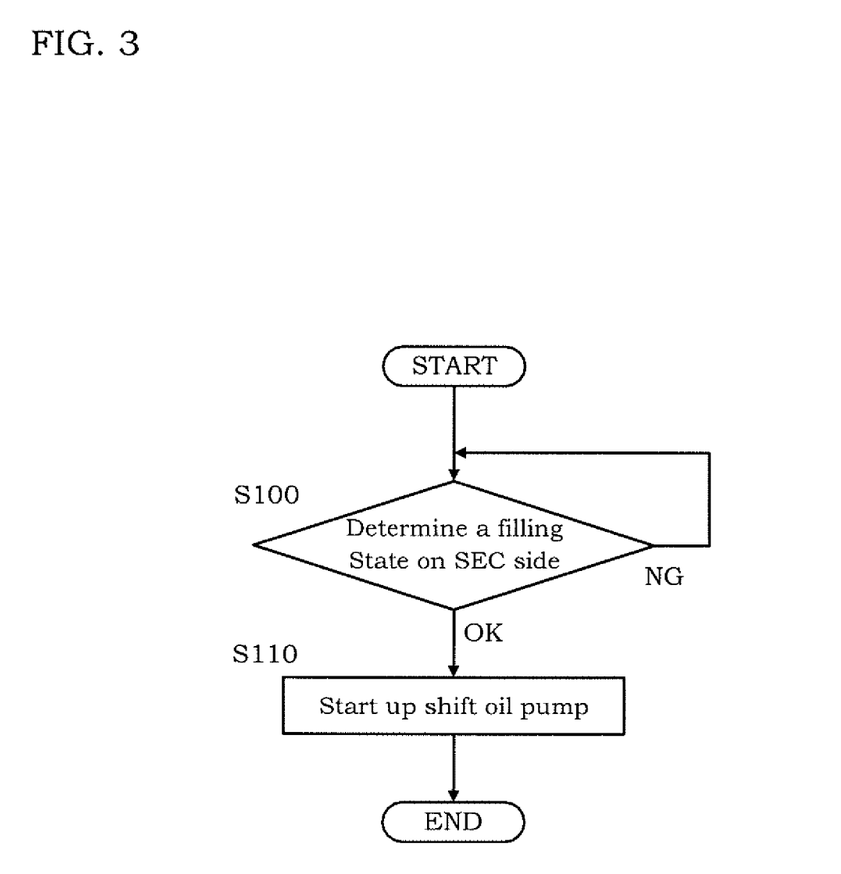
FIG. 3 is a flowchart showing a control routine of a first embodiment.

FIG. 3 is a flowchart showing a control routine of the hydraulic circuit 100 to be executed by the controller 10 at the time of start-up of the engine. The control routine is executed when the engine 1 is started up.

In Step S100, the controller 10 determines whether or not the oil is filled in the shift oil passage 106 on the SEC side by a method to be described later. The controller 10 repeats the determination of Step S100 until the oil is filled in the shift oil passage 106 on the SEC side, and when the oil is filled, starts up the shift oil pump 112 in Step S110. That is, in Step S100, by not permitting the operation of the shift oil pump 112 until the oil is filled in the shift oil passage 106 on the SEC side, the controller 10 restricts the operation of the shift oil pump 112.

Specific examples of the judging method of Step S100 include two examples as follows.

First Example

Once the oil is filled in the shift oil passage 106 on the SEC side, the shift oil pump 112 is rotated by an oil pressure difference between the SEC side and the PRI side without being driven by the electric motor 113. When the rotation speed of the shift oil pump 112 detected by the pump rotation speed sensor 118 becomes higher than predetermined rotation speed (threshold value 1), the controller 10 determines that the oil is filled in the shift oil passage 106 on the SEC side.

The threshold value 1 is set to be a value with which rotation of the shift oil pump 112 is obviously recognizable, for example, a few [rpm]. Theoretically, start of rotation of a rotation shaft of the shift oil pump 112 is required to be detected. Thus, a further smaller value may be set. However, in reality, the rotation shaft of the shift oil pump 112 may be moved by vibration of the vehicle, etc. Thus, in order to prevent erroneous determination caused by detecting motion due to such vibration of the vehicle, etc., the threshold value 1 of the above magnitude is set.

Figure 4:
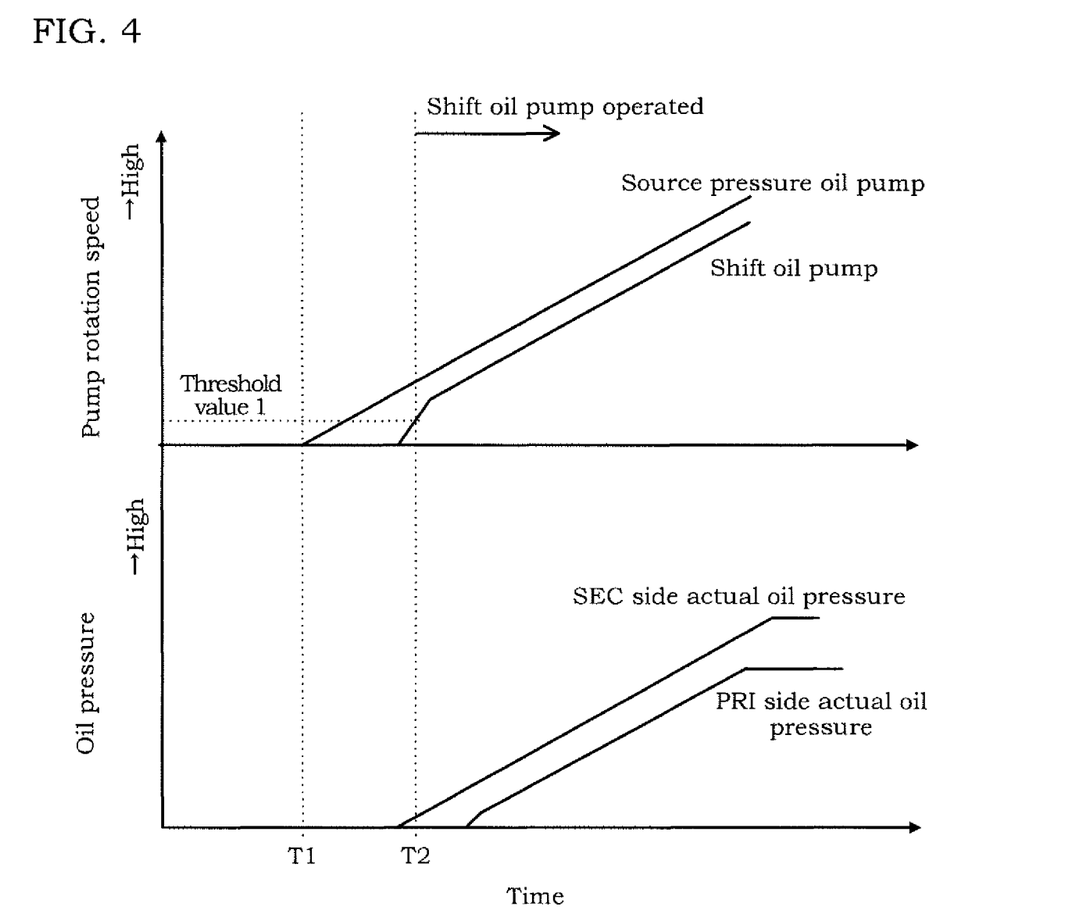
FIG. 4 is a timing chart of a case where the control routine of FIG. 3 is executed.

FIG. 4 is a timing chart of a case where the determination of the first example is performed.

When an operation of the source pressure oil pump 101 is started at timing T1, oil pressure on the SEC side (SEC side actual oil pressure) then starts to be increased. Accordingly, the shift oil pump 112 starts to be rotated. At timing T2 where the rotation speed of the shift oil pump 112 exceeds the threshold value 1, the controller 10 operates the electric motor 113 for operating the shift oil pump 112. After that, in accordance with an increase of rotation of the source pressure oil pump 101 and the shift oil pump 112, the SEC side actual oil pressure and PRI side actual oil pressure are increased.

Second Example

Figure 5:
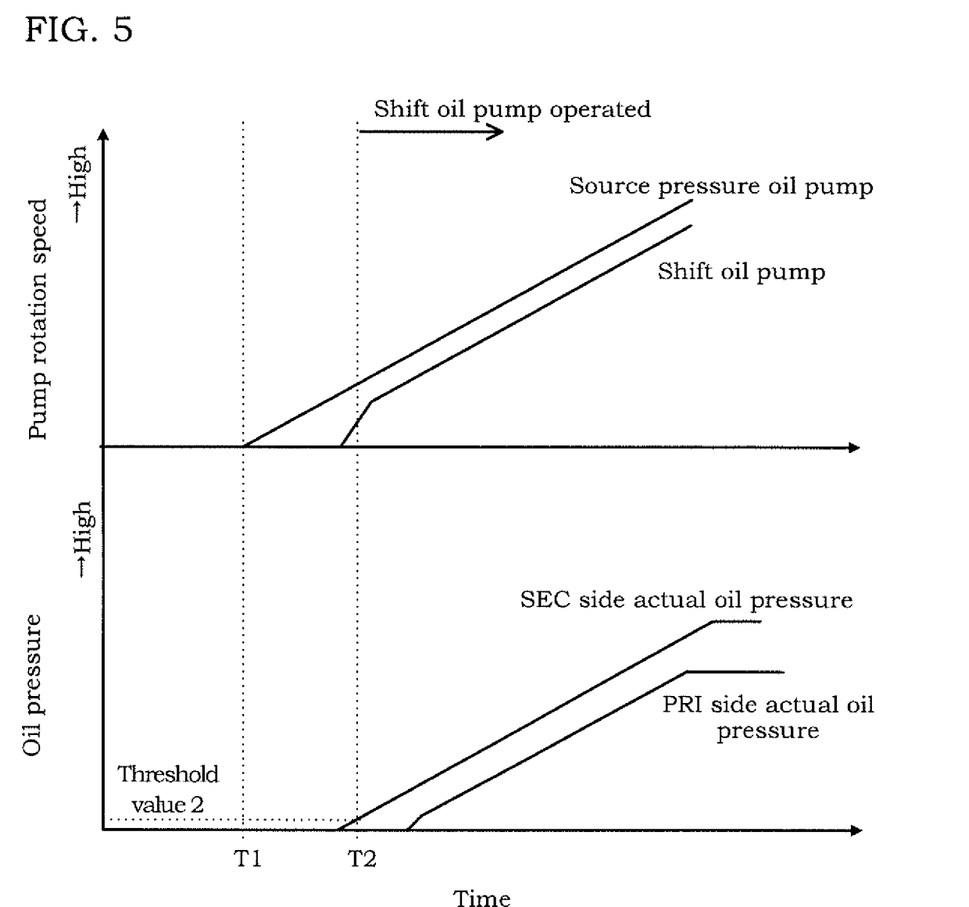
FIG. 5 is a timing chart of a case where a modified example of the control routine of FIG. 3 is executed.

Once the oil is filled in the shift oil passage 106 on the SEC side, the SEC side actual oil pressure is increased. When the increase of the SEC side actual oil pressure is detected by the SEC pressure sensor 116, that is, when the SEC side actual oil pressure exceeds predetermined oil pressure (threshold value 2), the controller 10 determines that the oil is filled in the shift oil passage 106 on the SEC side.

The threshold value 2 is set to be a value with which that the increase of the SEC side actual oil pressure is obviously recognizable. The threshold value 2 is set to have an enough magnitude in order to prevent erroneous determination as well as the threshold value 1.

FIG. 5 is a timing chart of a case where the determination of the second example is performed.

Both motions of the source oil pump 101 and the shift oil pump 112 and changes in the SEC side actual oil pressure and the PRI side actual oil pressure are the same as FIG. 4. However, the basis of determining the start of the operation of the shift oil pump 112 is the SEC side actual oil pressure being higher than the threshold value 2 at the timing T2.

As described above, in the first embodiment, after the source pressure oil pump 101 is started up, the operation of the shift oil pump 112 is restricted until the oil is filled in the shift oil passage 106 on the SEC pulley oil pressure chamber 42c side of the shift oil pump (electric oil pump) 112. Thereby, the shift oil pump 112 is not rotated in the no-oil state, and it is possible to suppress generation of noises due to air entrainment and deterioration of the shift oil pump 112 due to rotation in a no-lubrication state.

In the first embodiment, as an example, when the rotation speed of the shift oil pump 112 reaches the predetermined rotation speed, the operation of the shift oil pump 112 is permitted. That is, it is determined whether or not the oil is filled in the shift oil passage 106 on the SEC pulley oil pressure chamber 42c side of the shift oil pump 112 on the basis of the rotation speed of the shift oil pump 112. Thereby, even if the hydraulic circuit 100 does not include the SEC pressure sensor 116, it is possible to make proper determination.

In the first embodiment, as another example, when the oil pressure of the shift oil passage 106 on the SEC pulley oil pressure chamber 42c side of the shift oil pump 112 reaches the predetermined oil pressure, the operation of the shift oil pump 112 is permitted. That is, it is determined whether or not the oil is filled in the shift oil passage 106 on the SEC pulley oil pressure chamber 42c side of the shift oil pump 112 on the basis of the pressure of the oil passage. Thus, it is possible to make precise determination.

Second Embodiment

The second embodiment is similar to the first embodiment in a point that an operation of a shift oil pump 112 is restricted until oil is filled in a shift oil passage 106 on the SEC side. However, the second embodiment is different from the first embodiment in a point that a SEC side oil pressure command value is corrected while the operation of the shift oil pump 112 is restricted. Hereinafter, this different point will be mainly described.

When an engine 1 is started up, a controller 10 sets a target speed ratio on the basis of signals from a sensor and switch group 11, and sets a SEC side oil pressure command value corresponding to the target speed ratio. The more the SEC side oil pressure command value is increased, the more an amount of oil flowing into the shift oil passage 106 via a shift circuit pressure solenoid valve 107 is increased and the more a time to the oil filling in the shift oil passage 106 on the SEC side is shortened. Thus, in the second embodiment, by increasing the SEC side oil pressure command value more than a value set corresponding to the target speed ratio, a time to restrict the operation of the shift oil pump 112 is shortened.

Figure 6:
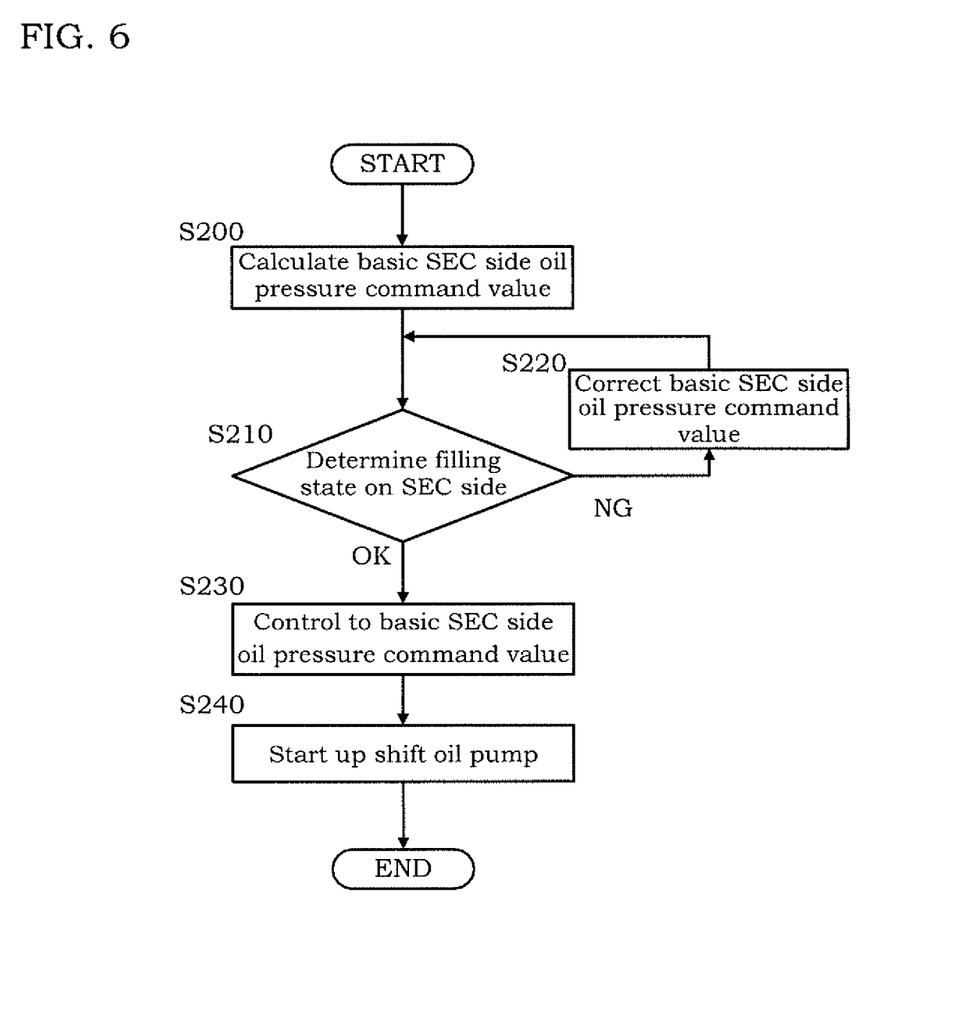
FIG. 6 is a flowchart showing a control routine of a second embodiment.

FIG. 6 is a flowchart showing a control routine of a hydraulic circuit 100 to be executed by the controller 10 in the second embodiment.

In Step S200, the controller 10 calculates a basic SEC side oil pressure command value. The basic SEC side oil pressure command value is the SEC side oil pressure command value corresponding to the target speed ratio.

In Step S210, the controller 10 determines whether or not the oil is filled in the shift oil passage 106 on the SEC side. Contents and a method of determination are the same as Step S100 of FIG. 3. The controller 10 executes processing of Step S210 in a case where the oil is filled in the shift oil passage 106 on the SEC side, and executes processing of Step S220 in a case where the oil is not filled.

Figure 7:
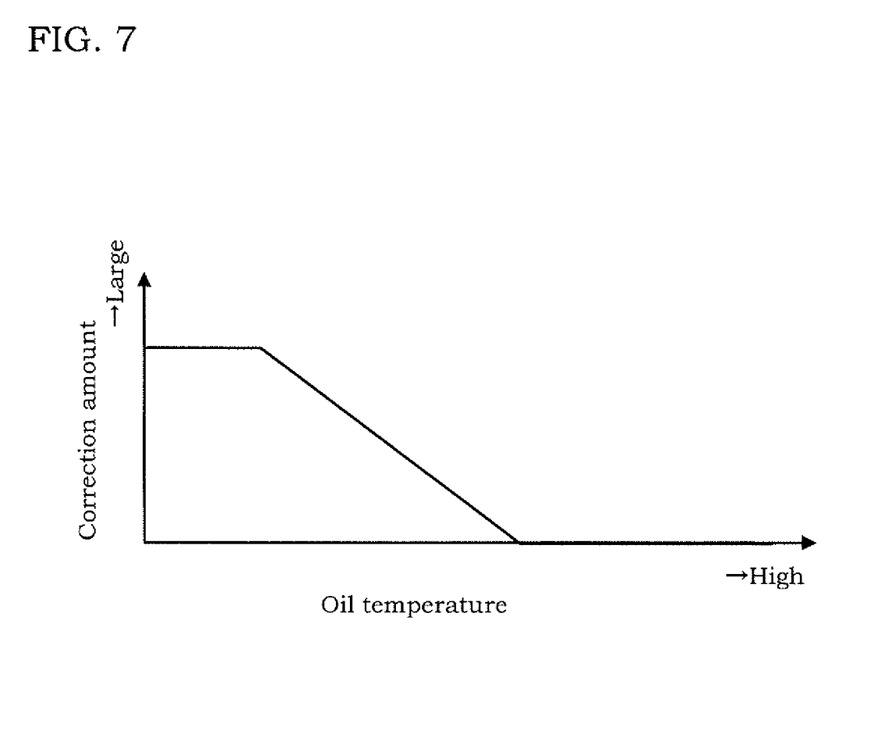
FIG. 7 is a correction amount table of a SEC side oil pressure command value.

In Step S220, the controller 10 makes correction to increase the basic SEC side oil pressure command value, and makes the value after the correction a SEC side oil pressure command value. Specifically, for example, a table in which the lower an oil temperature is, the larger a correction amount is set as shown in FIG. 7 is created in advance and stored in the controller 10, and the controller 10 adds the correction amount determined on the basis of the table to the basic SEC side oil pressure command value.

After repeating the processing of Step S220 described above until the oil is filled in the shift oil passage 106 on the SEC side, in Step S230, the controller 10 restores the SEC side oil pressure command value to the basic SEC side oil pressure command value calculated in Step S200. The controller 10 starts up the shift oil pump 112 in Step S240.

Figure 8:
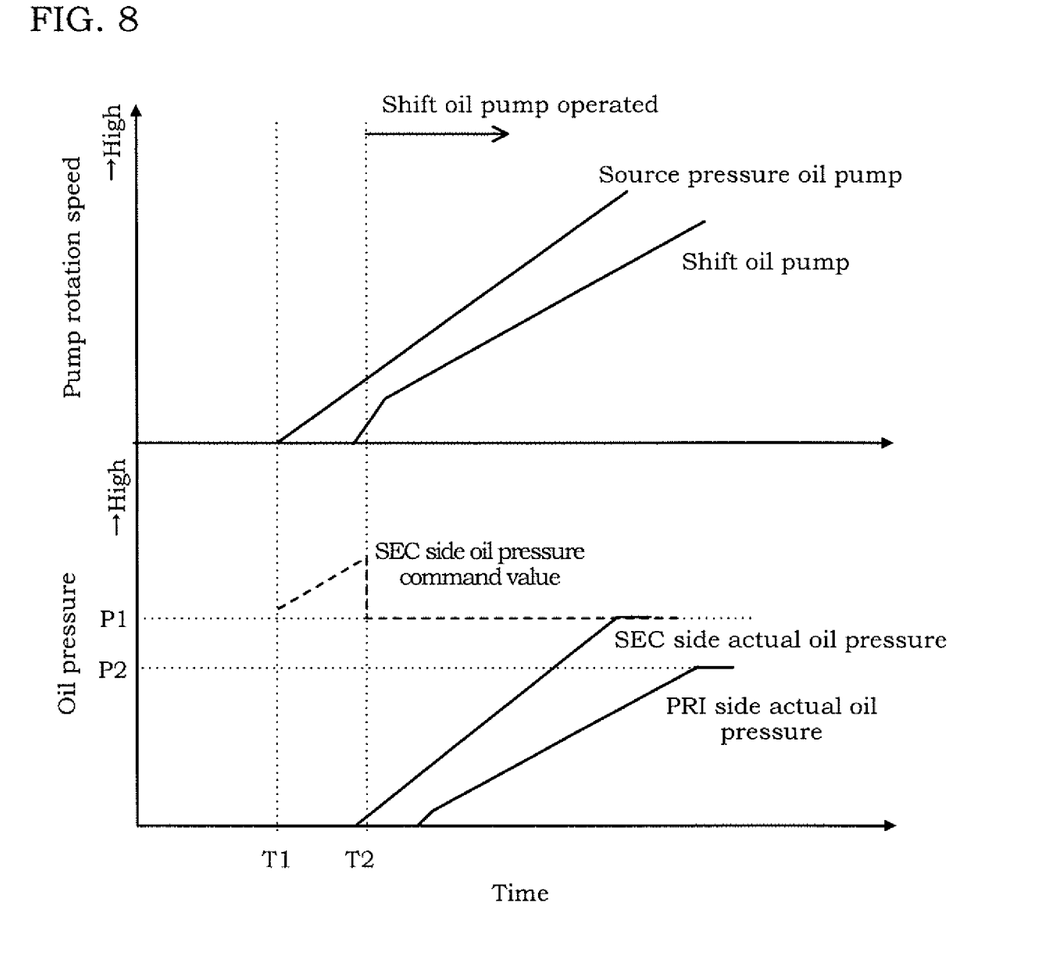
FIG. 8 is a timing chart of a case where the control routine of FIG. 6 is executed.

FIG. 8 is a timing chart of a case where the control described above is executed. Both motions of a source oil pump 101 and the shift oil pump 112 and changes in SEC side actual oil pressure and PRI side actual oil pressure are the same as FIG. 4. The reference sign P1 in the figure denotes the basic SEC side oil pressure command value, and the reference sign P2 denotes a PRI side oil pressure command value.

As shown in FIG. 8, between timing T1 where the source pressure oil pump 101 is started up and timing T2 where the shift oil passage 106 on the SEC side is brought into an oil-filled state, the SEC side oil pressure command value is gradually increased by repeating the correction. Thereby, a gap between the timing T1 and the timing T2 is shorter than a case where the basic SEC side oil pressure command value is not increased and corrected.

The SEC side oil pressure command value is restored to the basic SEC side oil pressure command value at the timing T2.

Figure 9:
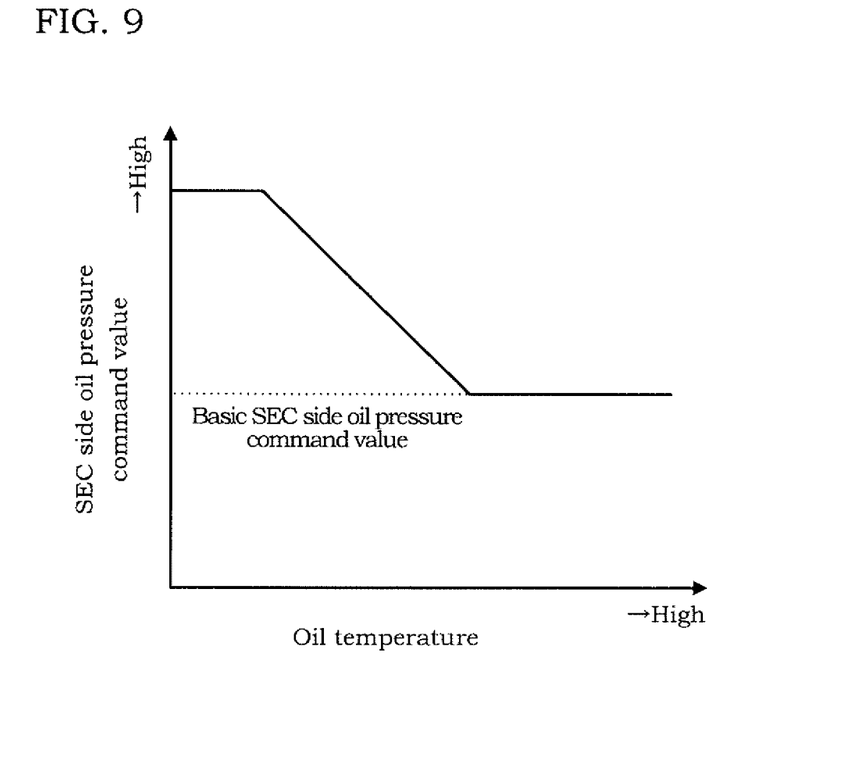
FIG. 9 is a table used for calculating the SEC side oil pressure command value.

In Step S220 of FIG. 6, the SEC side oil pressure command value is set between the timing T1 and the timing T2 by correcting the basic SEC side oil pressure command value. However, the present invention is not limited to this. For example, a table in which the SEC side oil pressure command value is set in accordance with the oil temperature as shown in FIG. 9 may be created in advance and stored in the controller 10, and the controller 10 may directly calculate the SEC side oil pressure command value from the table. The case where the SEC side oil pressure command value is gradually increased from the timing T1 to the timing T2 is described above. However, the present invention is not limited to this. For example, at the time point of the timing T1, the SEC side oil pressure command value may be set to be the SEC side oil pressure command value of the timing T2 of FIG. 8 and this may be maintained to the timing T2.

As described above, in the second embodiment, while the operation of the shift oil pump 112 is restricted, target oil pressure of the shift oil passage 106 on the SEC pulley oil pressure chamber 42c side of the shift oil pump 112 is set to be higher than a case where the operation of the shift oil pump 112 is not restricted. Thereby, increasing speed of the SEC pressure is increased. Thus, the time to restrict the operation of the shift oil pump 112 is shortened more than a case where the target oil pressure is not increased. As a result, it is possible to shorten a time required for obtaining a shiftable state more than a case where the target oil pressure is not increased.

In the second embodiment, the lower the oil temperature is, the higher the target oil pressure while the operation of the shift oil pump 112 is restricted is set. The lower the temperature is, the greater friction of the pumps 101, 112 is. However, according to the second embodiment, as the friction is more increased, the source pressure is more increased. Thus, it is possible to shorten the time required for obtaining the shiftable state more than a case where the target oil pressure is not increased.

Third Embodiment

In the first embodiment and the second embodiment, the operation of the shift oil pump 112 is restricted until the oil is filled in the shift oil passage 106 on the SEC side. Meanwhile, in the third embodiment, after oil is filled in a shift oil passage 106 on the SEC side, an operation of a shift oil pump 112 is further restricted until oil pressure of the shift oil passage 106 on the PRI side reaches predetermined pressure.

Figure 10:
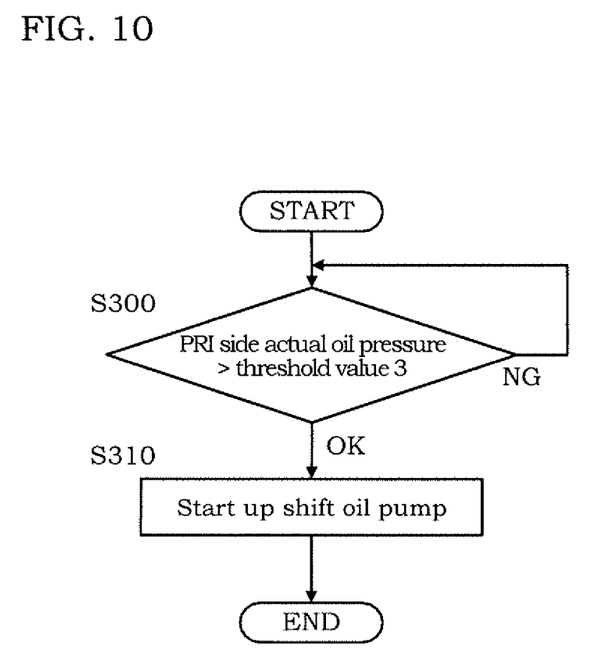
FIG. 10 is a flowchart showing a control routine of a third embodiment.

FIG. 10 is a flowchart showing a control routine of the third embodiment described above.

In Step S300, a controller 10 determines whether or not actual oil pressure of the shift oil passage 106 on the PRI side becomes higher than a threshold value 3. The threshold value 3 is PRI pressure determined on the basis of a target speed ratio.

When the actual oil pressure of the shift oil passage 106 on the PRI side becomes higher than the threshold value 3, the controller 10 starts up the shift oil pump 112 in Step S310.

Figure 11:
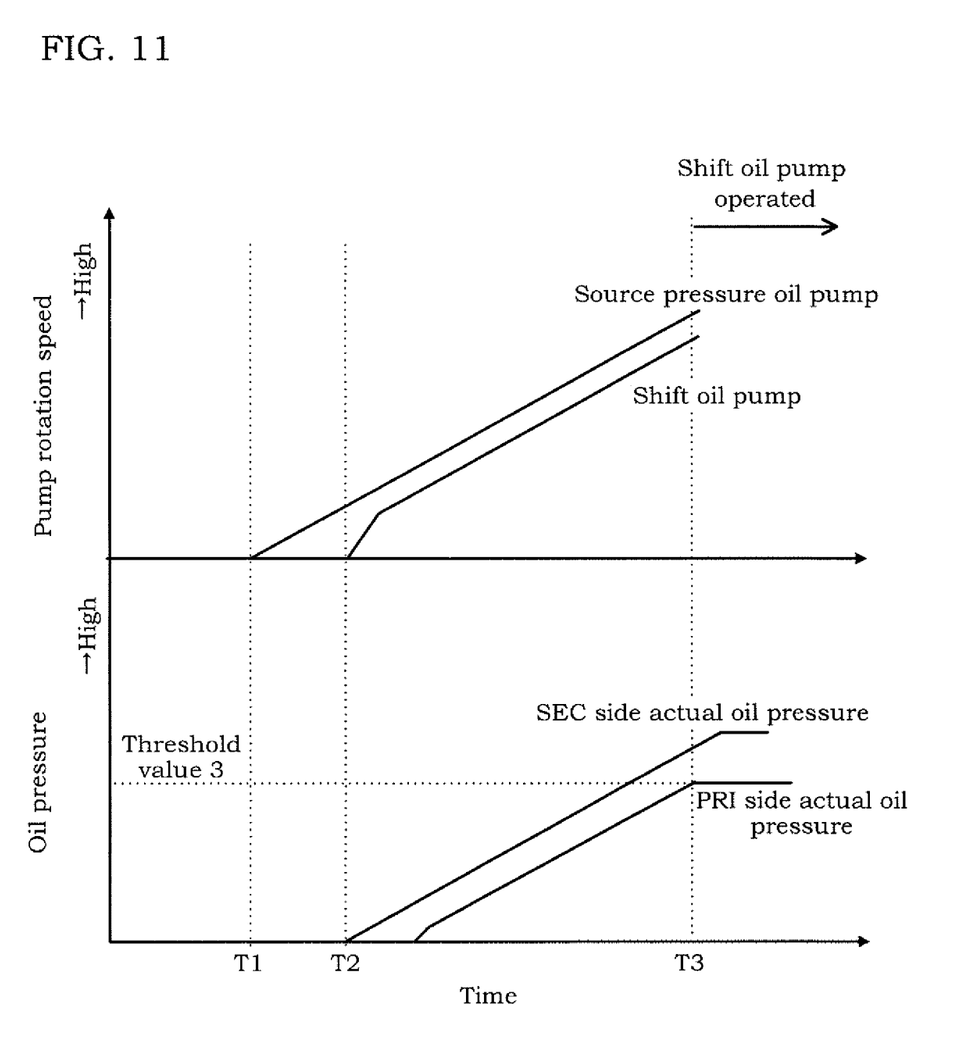
FIG. 11 is a timing chart of a case where the control routine of FIG. 10 is executed.

FIG. 11 is a timing chart of a case where the control routine of FIG. 10 is executed.

After a source pressure oil pump 101 is started up at timing T1, SEC side actual oil pressure starts to be increased at timing T2. In accordance with an increase of the SEC side actual oil pressure, the shift oil pump 112 starts to be rotated by a pressure difference between the SEC side and the PRI side. The shift oil pump 112 is rotated by the pressure difference described above. Thus, when the SEC side actual oil pressure is continuously increased, rotation speed of the shift oil pump 112 is also increased. Once PRI side actual oil pressure reaches the PRI pressure (threshold value 3) determined on the basis of the target speed ratio at timing T3, the controller 10 starts up the shift oil pump 112.

In such a way, when the operation of the shift oil pump 112 is restricted until the PRI side actual oil pressure reaches the PRI pressure determined on the basis of the target speed ratio, it is possible to reduce electric power consumed by the shift oil pump 112 until the PRI pressure is increased to the pressure determined on the basis of the target speed ratio. That is, in comparison to the first embodiment and the second embodiment, it is possible to reduce the consumed electric power of the shift oil pump 112.

Figure 12:
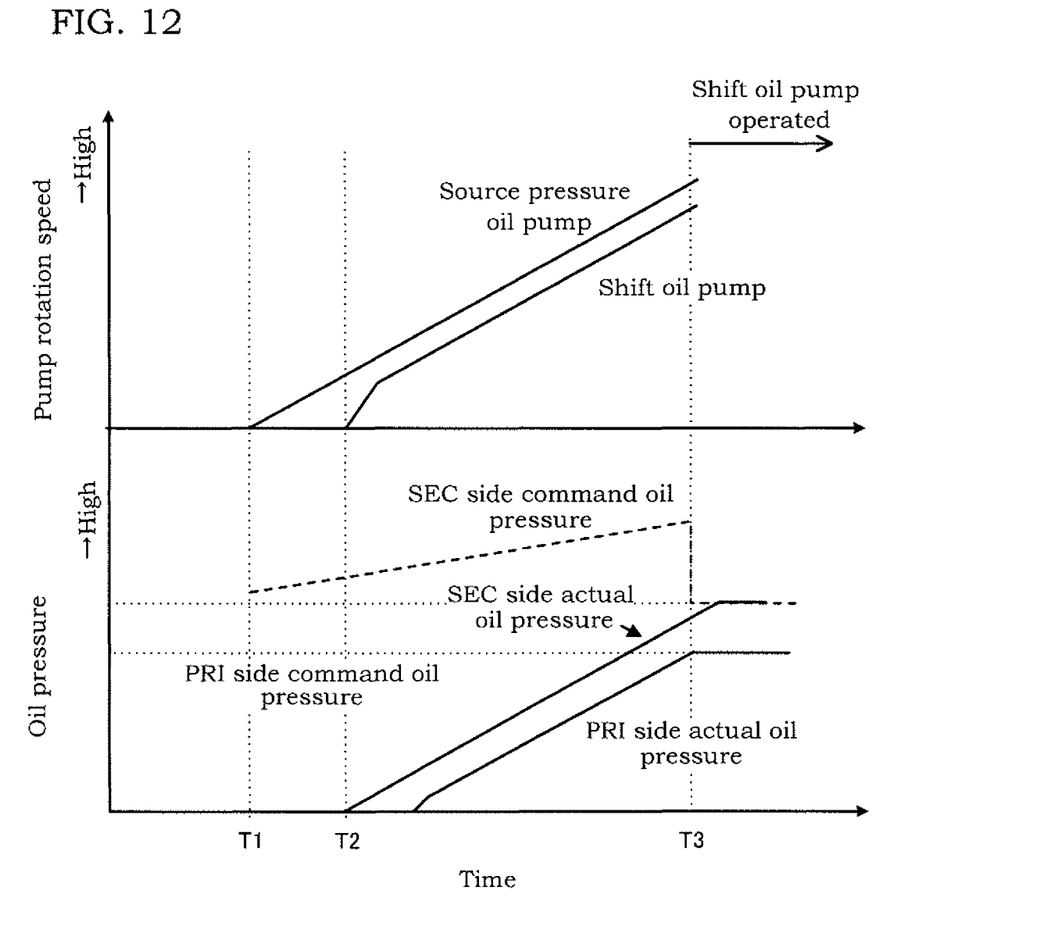
FIG. 12 is a timing chart of a case where a SEC side oil pressure command value is corrected in the third embodiment.

In the third embodiment, correction of SEC side command oil pressure may be performed as well as the second embodiment. In this case, as shown in FIG. 12, the correction of the SEC side command oil pressure is continued until the timing T3.

As described above, in the third embodiment, even after the oil is filled in the shift oil passage 106 on the SEC pulley oil pressure chamber 42c side of the shift oil pump 112, the operation of the shift oil pump 112 is restricted until the actual oil pressure of the shift oil passage 106 on the PRI pulley oil pressure chamber 41c side of the shift oil pump 112 reaches command oil pressure. Thereby, it is possible to reduce the electric power consumed by the shift oil pump 112 until the PRI pressure is increased to the pressure determined on the basis of the target speed ratio.

In the embodiments described above, the configuration in which as an oil pump adapted to supply source pressure, the mechanical oil pump (source pressure oil pump 101) and the electric oil pump (line pressure electric oil pump 111) are used together is described. However, any one of the oil pumps may be provided.

Embodiments of the present invention are described above. However, the above embodiments do not intend to limit the technical scope of the present invention to the specific configurations of the above embodiments but only indicate part of application examples of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A control method of a continuously variable transmission, comprising:
   supplying oil pressure to a secondary pulley oil chamber by a source pressure oil pump; and
   controlling a flow of oil into and from a primary pulley oil chamber by an electric oil pump arranged in an oil passage between the primary pulley oil chamber and the secondary pulley oil chamber,
   wherein, after start-up of the source pressure oil pump, an operation of the electric oil pump is restricted until the oil is filled in the oil passage on the secondary pulley oil chamber side of the electric oil pump, and
   wherein the operation of the electric oil pump is permitted when rotation speed of the electric oil pump reaches a predetermined rotation speed.

2. The control method of the continuously variable transmission according to claim 1,
   wherein, while the operation of the electric oil pump is restricted, target oil pressure of the oil passage on the secondary pulley oil chamber side of the electric oil pump is set to be higher than a case where the operation of the electric oil pump is not restricted.

3. The control method of the continuously variable transmission according to claim 2,
   wherein, the lower an oil temperature is, the higher the target oil pressure is while the operation of the electric oil pump is restricted.

4. A control device of a continuously variable transmission, comprising:
   a source pressure oil pump adapted to supply oil pressure to a secondary pulley oil chamber;
   an oil passage providing communication between a primary pulley oil chamber and the secondary pulley oil chamber;
   an electric oil pump placed in the oil passage; and
   a controller unit adapted to control a flow of oil into and from the primary pulley oil chamber by the electric oil pump,
   wherein, after start-up of the source pressure oil pump, the controller unit restricts an operation of the electric oil pump until the oil is filled in the oil passage on the secondary pulley oil chamber side of the electric oil pump, and
   wherein the operation of the electric oil pump is permitted when rotation speed of the electric oil pump reaches a predetermined rotation speed.

\* \* \* \* \*